US011060363B1

(12) United States Patent
Pruitt et al.

(10) Patent No.: US 11,060,363 B1
(45) Date of Patent: Jul. 13, 2021

(54) STARTING MANDREL

(71) Applicants: Grant Pruitt, Fort Smith, AR (US);
Cris Braun, Van Buren, AR (US);
Shawn McBride, Fort Smith, AR (US);
Benjamin Micah Spahn, Alma, AR (US)

(72) Inventors: Grant Pruitt, Fort Smith, AR (US);
Cris Braun, Van Buren, AR (US);
Shawn McBride, Fort Smith, AR (US);
Benjamin Micah Spahn, Alma, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 189 days.

(21) Appl. No.: 16/137,358

(22) Filed: Sep. 20, 2018

Related U.S. Application Data (60) Provisional application No. 62/561,109, filed on Sep. 20, 2017.

(51) Int. Cl.
*E21B 19/24* (2006.01)
*F16L 37/02* (2006.01)

(52) U.S. Cl.
CPC .............. *E21B 19/24* (2013.01); *F16L 37/02* (2013.01)

(58) Field of Classification Search
CPC .................................. E21B 19/24; B66C 1/56
See application file for complete search history.

(56) References Cited

U.S. PATENT DOCUMENTS

| | | | | |
|---|---|---|---|---|
| 1,335,431 | A * | 3/1920 | Fair .................. | E21B 31/20 294/86.1 |
| 1,344,774 | A * | 6/1920 | Stafford et al. ....... | E21B 17/042 285/90 |
| 1,414,531 | A * | 5/1922 | Straight ............... | E21B 31/20 294/86.14 |
| 2,179,594 | A * | 11/1939 | Johnson .............. | E21B 31/20 294/86.22 |
| 3,375,034 | A * | 3/1968 | Blacksher ............ | E21B 31/20 294/86.24 |
| 5,409,060 | A * | 4/1995 | Carter ................. | E21B 7/061 166/117.5 |
| 5,642,912 | A * | 7/1997 | Parish, II ............ | B66C 1/56 294/86.12 |
| 2004/0216924 | A1* | 11/2004 | Pietras ................ | E21B 19/07 175/57 |
| 2007/0023190 | A1* | 2/2007 | Hall .................... | E21B 43/08 166/350 |
| 2011/0024118 | A1* | 2/2011 | Davis .................. | E21B 31/125 166/301 |

* cited by examiner

*Primary Examiner* — Blake E Michener
(74) *Attorney, Agent, or Firm* — Schrantz Law Firm, PLLC; Stephen D. Schrantz (57) ABSTRACT

A mandrel assembly secures to a mandrel and drill pipe to start the drill pipe through the RCD. The mandrel assembly attaches to different drill pipe configurations via an attachment finger. The attachment finger secures the mandrel to the drill pipe. The attachment finger inserts into the attachment aperture of the mandrel and the drill pipe to secure the mandrel with the drill pipe. Once attached, the user removes the mandrel by pulling the mandrel away from the drill pipe via removal apertures.

18 Claims, 8 Drawing Sheets

STARTING MANDREL

CROSS-REFERENCE TO RELATED APPLICATIONS

This application claims priority to and is a continuation-in-part of U.S. Patent Application No. 62/561,109 filed on Sep. 20, 2017 entitled STARTING MANDREL which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention is related to a starting mandrel for drilling. The mandrel secures to the end of a drill pipe. The mandrel attaches to the downhole end of the drill pipe. The mandrel assists with inserting the drill pipe through the RCD. The mandrel narrows vertically downward to assist with inserting the drill pipe through the RCD. The mandrel is lubricated to insert the mandrel through the RCD. The user stabs the mandrel attached to the drill pipe through the RCD. The drill pipe can then pass through the RCD to go downhole.

Traditionally, mandrels provide a threaded aperture that receives the drill pipe pin end. The threads on the drill pipe pin end can vary. Some threads are API standard while some threads are proprietary. The present invention eliminates the need for a threaded connection. Such elimination of the threaded connection reduces the number of mandrels needed at a drilling operation. The improved mandrel of the present invention simplifies the process of installing the drill pipe through the RCD.

SUMMARY OF THE INVENTION

The present invention provides a mandrel attachable to different drill pipe configurations. The mandrel assembly provides an attachment finger that secures the mandrel to the drill pipe. Traditionally, the mandrel screws onto the drill pipe. The pin end of the drill pipe is threaded for installing the drill pipe to the mandrel. The mandrel is also threaded for receiving the pin end of the drill pipe.

The threads may vary depending on the pin end of the drill pipe. Because of the varying threads, different mandrels may be required depending on the threads of the pin end of the drill pipe. Multiple mandrels may then be required at the drilling operation based on the size of the drill pipe and the threads on the drill pipes.

The present invention reduces the number of mandrels required at the drilling operation. The mandrel assembly of the present invention provides an attachment finger that secures the drill pipe to the mandrel. The attachment finger eliminates the need for threads. The attachment finger inserts into the mandrel and the drill pipe to secure the mandrel with the drill pipe.

An attachment head of the attachment finger inserts into the attachment aperture of the mandrel. Insertion of the attachment head into the mandrel secures the attachment finger to the mandrel.

The attachment body of the attachment finger inserts into the drill pipe. Insertion of the attachment body into the drill pipe secures the attachment finger to the drill pipe.

The attachment body of one embodiment is splined to reduce friction of the attachment finger with the drill pipe. The reduced friction of the attachment body with the drill pipe simplifies the process of removing the attachment finger from the drill pipe.

A removal aperture of the mandrel provides an area for the user to grip the mandrel. The user inserts a removal device, including but not limited to a rod, a pipe, a shaft, a rigid object, or other removal device through the removal apertures. The user can then pull the removal device away from the drill pipe to remove the mandrel from the drill pipe. The splined shaft of the attachment body reduces the friction between the attachment finger and the drill pipe to simplify removal of the mandrel from the drill pipe.

It is an object of the present invention to reduce the number of mandrels required at the drilling operation.

It is a further object of the present invention to simplify the process of inserting the drill pipe through the RCD.

It is a further object of the present invention to simplify the attachment of the mandrel to the drill pipe.

It is a further object of the present invention to secure the drill pipe to the mandrel.

It is a further object of the present invention to reduce friction between the attachment finger and the drill pipe.

It is a further object of the present invention to provide sufficient friction between the attachment finger and the mandrel to secure the drill pipe to the mandrel.

It is a further object of the present invention to provide a removal aperture for removing the mandrel from the drill pipe.

In addition to the features and advantages of the starting mandrel according to the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
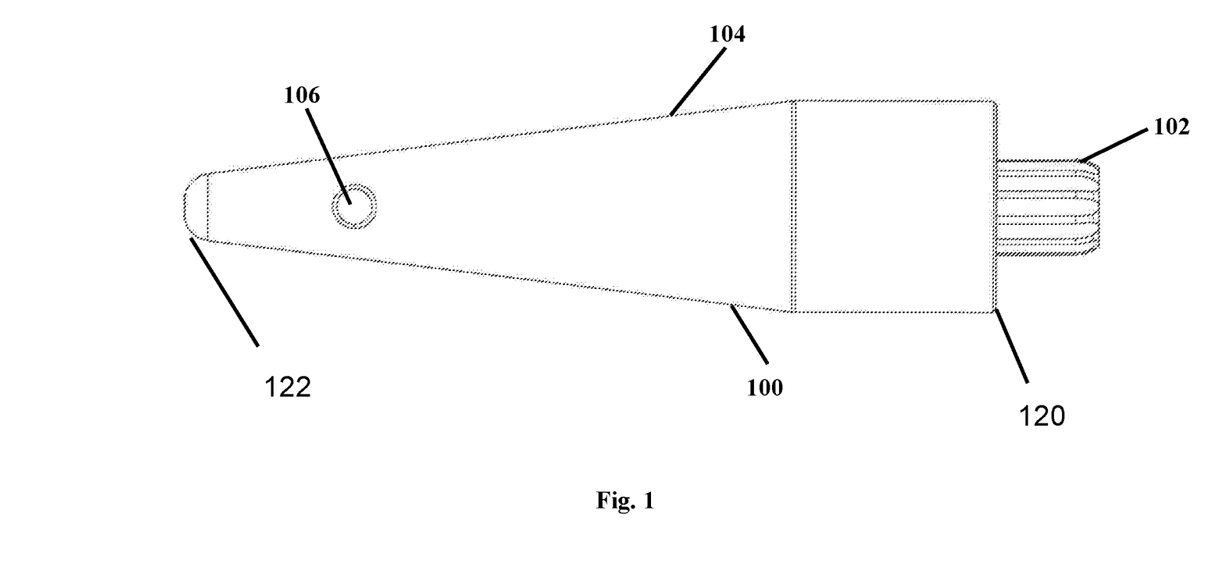
FIG. 1 is a front view of one embodiment of the present invention.
Figure 2:
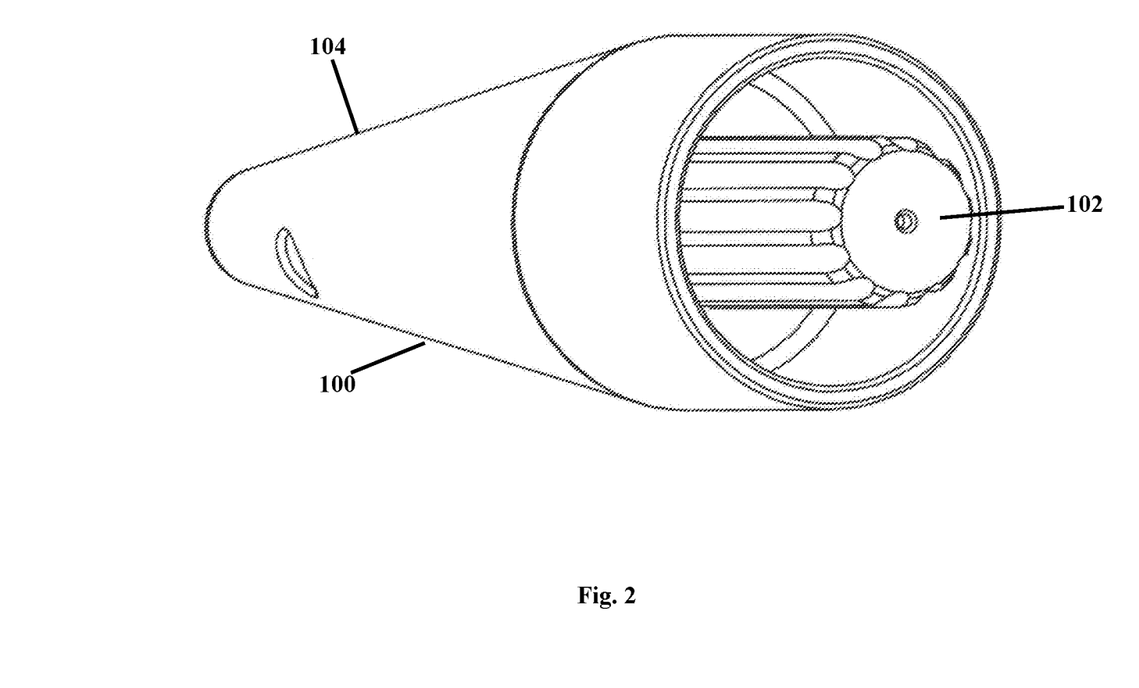
FIG. 2 is a perspective view thereof.
Figure 3:
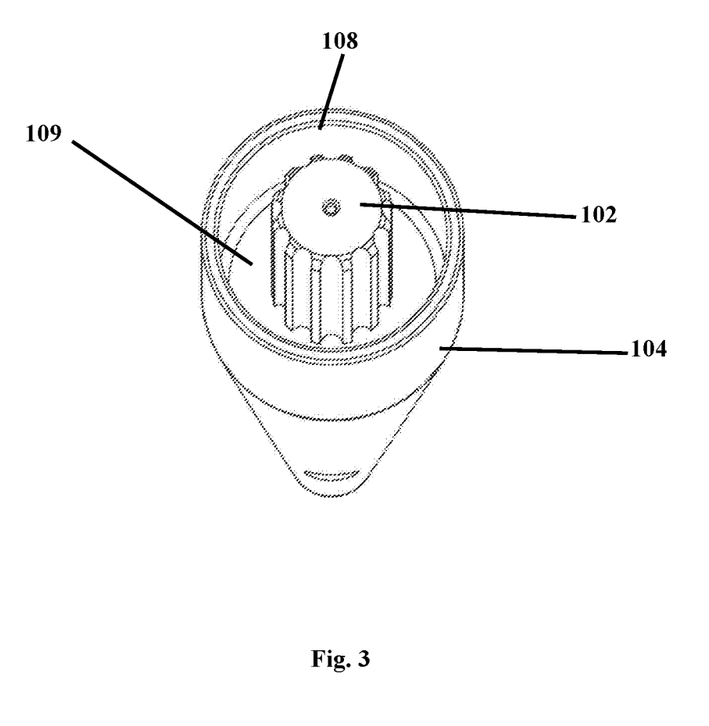
FIG. 3 is a top perspective view thereof.
Figure 4:
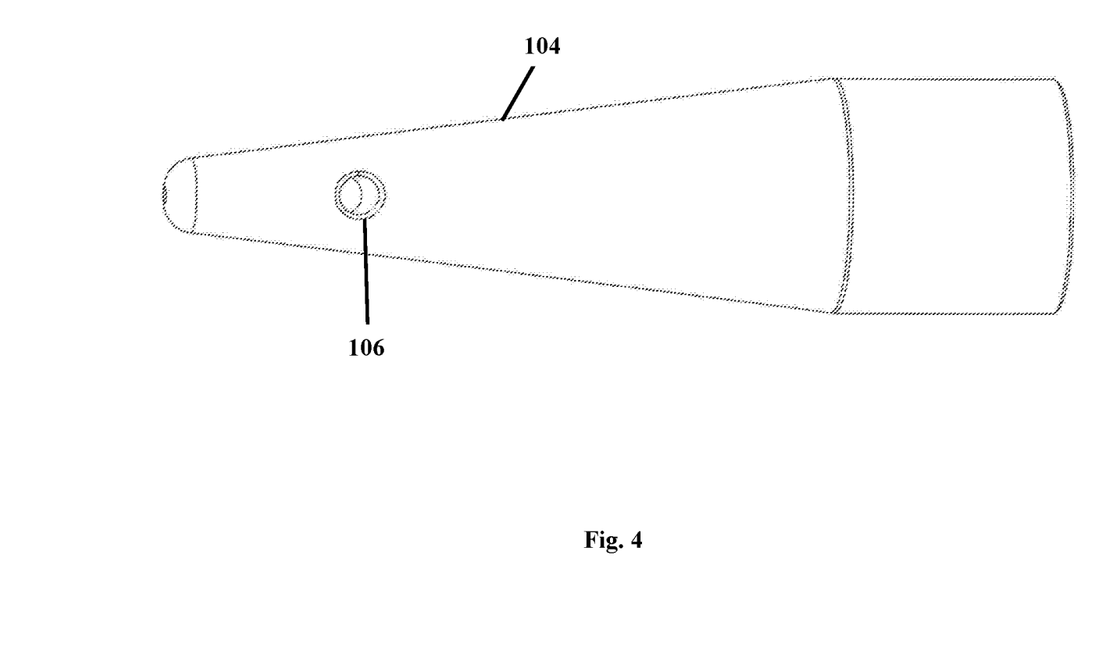
FIG. 4 is a perspective view of a mandrel of one embodiment of the present invention.

Referring to FIGS. 1-3, the mandrel assembly of the present invention is generally shown as 100. The drilling pipe secures to a mandrel assembly 100 of the present invention for starting the drill pipe through the RCD. The mandrel assembly 100 secures to the drill pipe for stabbing the mandrel 100 and the drill pipe through the rubbers within the RCD. The attachment end 120 of the mandrel 100 tapers to the insertion end 122 that inserts initially into the RCD.

The mandrel assembly 100 attaches to different drill pipe configurations via an attachment finger 102. The attachment finger 102 secures the mandrel 104 to the drill pipe. The attachment finger 102 eliminates the need for threads. The attachment finger 102 inserts into the mandrel 104 and the drill pipe to secure the mandrel 104 with the drill pipe.

Once attached, the user removes the mandrel by pulling the mandrel 104 away from the drill pipe via removal apertures 106. The removal apertures 106 provide two apertures aligned with each other through the mandrel 104. The user inserts a removal device, including but not limited to a rod, a pipe, a shaft, a rigid object, or other removal device through the removal apertures 106. The user can then pull the removal device away from the drill pipe 114 to remove the mandrel 104 from the drill pipe 114. The user can then pull the removal device inserted through the removal apertures 106 away from the drill pipe 114 to remove the mandrel 104 from the drill pipe 114.

Figure 5:
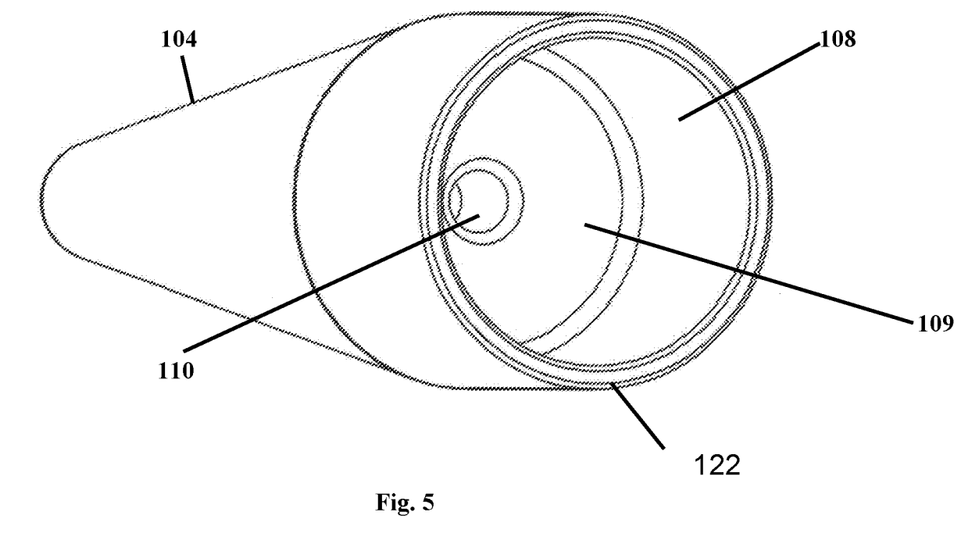
FIG. 5 is a perspective view thereof.
Figure 6:
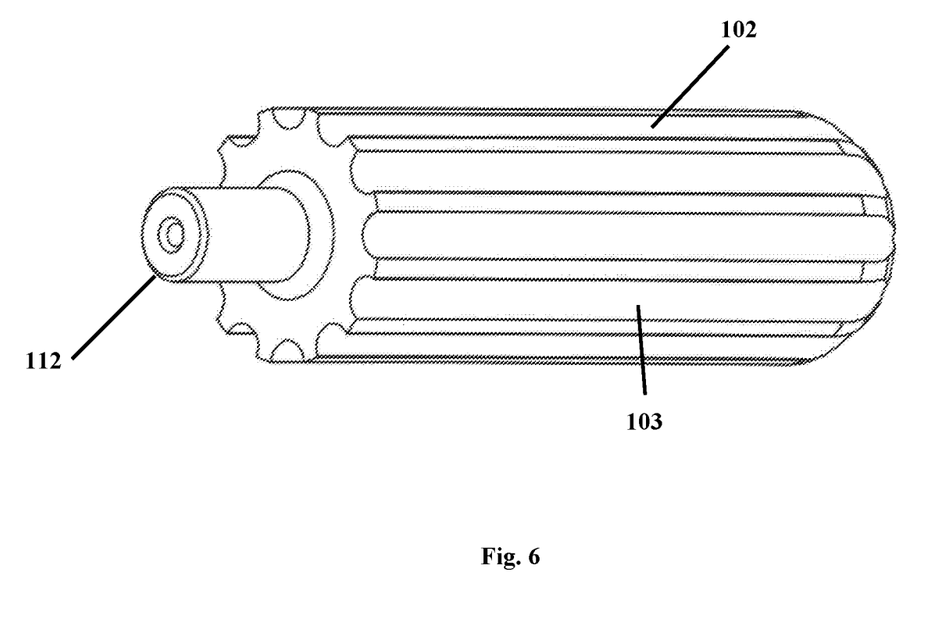
FIG. 6 is a perspective view of an attachment finger of one embodiment of the present invention.

FIGS. 5 and 6 show the mandrel 104 separated from the attachment finger 102. An attachment head 112 of the attachment finger 102 inserts into the attachment aperture 110 on the attachment end 122 of the mandrel 104.

Insertion of the attachment head 112 into the mandrel 104 secures the attachment finger 102 to the mandrel 104.

The mandrel 104 provides a mandrel neck 108 that extends upward above the attachment aperture 110. The mandrel neck 108 creates a tubular top to the mandrel 104. The mandrel neck 108 extends vertically upward from the mandrel shoulder 109. The attachment aperture 110 recesses vertically downward from the mandrel shoulder 109. The mandrel neck 108 extends radially outward from the attachment aperture 110 of one embodiment.

The mandrel neck 108 accepts insertion of the drill pipe into the opening formed by the mandrel neck 108. The opening formed by mandrel neck 108 accepts the drill pipe with the attachment finger 102. The attachment head 112 inserts into the attachment aperture 110. Insertion of the attachment head 112 into the attachment aperture 110 secures the attachment finger 102 to the mandrel 104.

Figure 7:
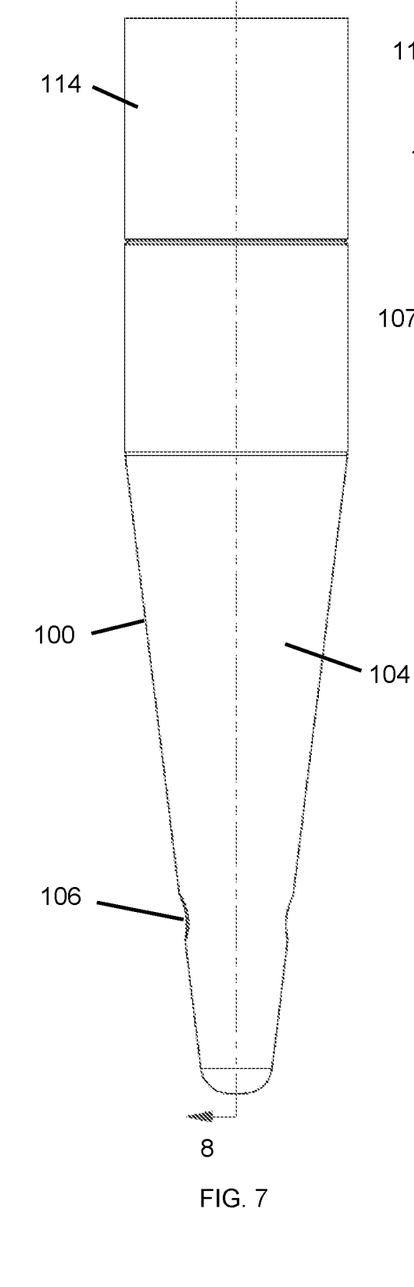
FIG. 7 is an environmental view of one embodiment of the present invention.
Figure 8:
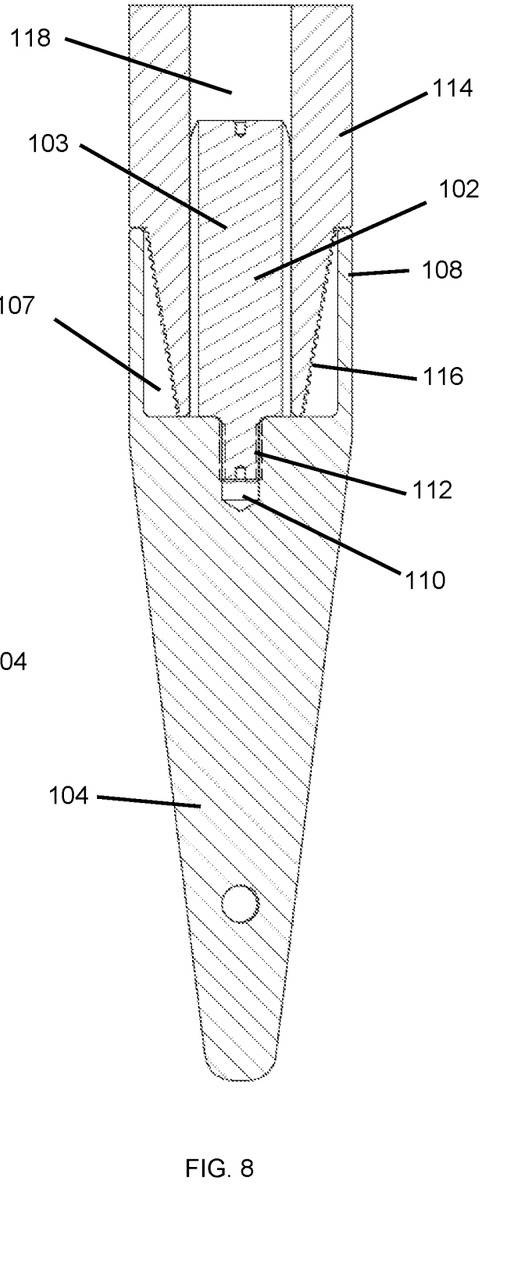
FIG. 8 is a sectional view thereof.
Figure 9:
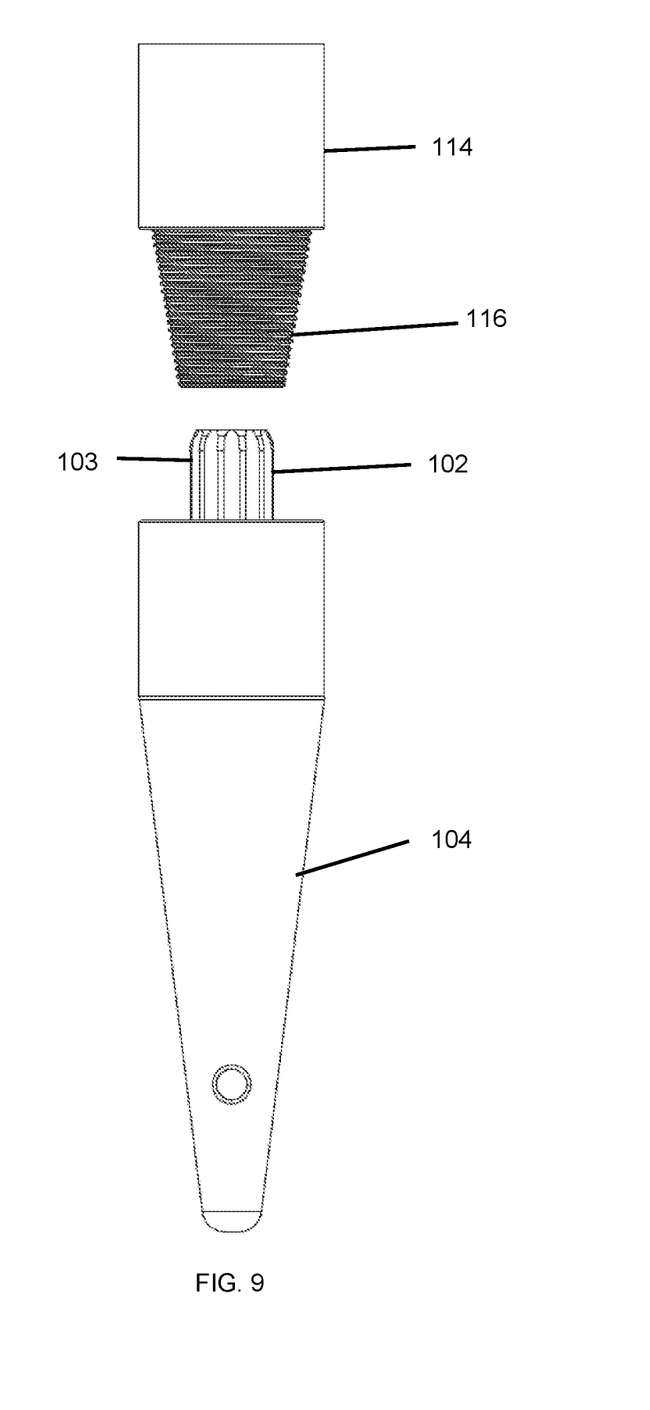
FIG. 9 is an environmental view thereof.

FIGS. 7-9 show the mandrel assembly 100 with mandrel 104 secured to the drill pipe 114. The removal apertures 106 simplify the process of removing the mandrel 104 from the drill pipe 114. The removal apertures 106 of the mandrel 104 provide an area for the user to grip the mandrel 104. The user can then pull the mandrel 104 downward from the drill pipe 114. The splined shaft of the attachment body 103 reduces the friction between the attachment finger 102 and the drill pipe 114 to simplify removal of the mandrel 104 from the drill pipe 114.

Referring to FIGS. 8 and 9, the attachment body 103 of the attachment finger 102 inserts into an opening 118 of the drill pipe 114. Insertion of the attachment body 103 into the opening 118 of the drill pipe 114 secures the attachment finger 102 to the drill pipe 104.

The attachment body 103 of one embodiment is splined to reduce friction of the attachment finger 102 with the drill pipe 114. The reduced friction of the attachment body 103 with the drill pipe 114 simplifies the process of removing the attachment finger 102 from the drill pipe 114.

The pin end 116 of the drill pipe 114 inserts into the opening 107 formed by the mandrel neck 108. The pin end 116 provides threads for the drill pipe. The pin end 116 inserts into the opening 107. The attachment head 112 inserts into the attachment aperture 110. Insertion of the pin end 116 into opening 107 and insertion of the attachment head 112 into attachment aperture 110 secures the attachment finger 102 to the mandrel 104.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mandrel system for stabbing drill pipe through a rotating control device, the system comprising:
   a mandrel having an insertion end and an attachment end wherein the attachment end tapers to the insertion end;
   an attachment aperture of the mandrel located at the attachment end, the attachment aperture extending longitudinally from the attachment end towards the insertion end;
   an attachment finger having an attachment head that inserts longitudinally into the attachment aperture;
   an attachment body of the attachment finger, wherein the attachment body is sized to insert longitudinally into the drill pipe; and
   at least one outer ridge extending longitudinally across the attachment body without winding around an outer surface of the attachment body.

2. The system of claim 1 further comprising:
   a removal aperture of the mandrel wherein the removal aperture extends through the mandrel.

3. The system of claim 1 wherein the at least one outer ridge defines splines for insertion into the drill pipe.

4. The system of claim 3 wherein the cross section of the splined attachment body is larger than the cross section of the attachment head.

5. The system of claim 3 wherein the width of the splined attachment body is greater than the width of the attachment head.

6. The system of claim 1 wherein the attachment finger and the mandrel are two distinct pieces such that the attachment finger detaches from the mandrel.

7. The system of claim 1 wherein the at least one outer ridge comprises a plurality of outer ridges that extend longitudinally parallel to a longitudinal axis to reduce friction between the attachment body and the drill pipe wherein the attachment body inserts vertically into the drill pipe.

8. The system of claim 1 wherein the attachment head has an outer radial surface.

9. The system of claim 1 wherein the outer ridge extends parallel to a longitudinal axis.

10. The system of claim 1 wherein the outer ridge frictionally engages the drill pipe without threaded attachment of the attachment body with the drill pipe.

11. A mandrel system for stabbing drill pipe through a rotating control device, the system comprising:
- a mandrel having an insertion end and an attachment end wherein the attachment end tapers to the insertion end;
- an attachment aperture of the mandrel located at the attachment end, the attachment aperture extending longitudinally from the attachment end towards the insertion end;
- an attachment finger having an attachment head that inserts longitudinally into the attachment aperture;
- an attachment body of the attachment finger, wherein the attachment body is sized to insert longitudinally into the drill pipe; and
- a first outer ridge extending longitudinally across the attachment body, wherein the first outer ridge forms an outermost surface of the attachment body without winding around an outer surface of the attachment body;
- a first groove extending longitudinally across the attachment body wherein the groove is located adjacent the first outer ridge, wherein the first outer ridge extends radially outward from the first groove.

12. The system of claim 11 wherein the first outer ridge extends parallel to a longitudinal axis.

13. The system of claim 12 wherein the cross section of the splined attachment body is larger than the cross section of the attachment head.

14. The system of claim 11 further comprising:
- a removal aperture of the mandrel wherein the removal aperture extends through the mandrel.

15. The system of claim 11 wherein the attachment finger and the mandrel are two distinct pieces such that the attachment finger detaches from the mandrel.

16. A mandrel system for stabbing drill pipe through a rotating control device, the system comprising:
- a mandrel having an insertion end and an attachment end wherein the attachment end tapers to the insertion end;
- an attachment aperture of the mandrel located at the attachment end, the attachment aperture extending longitudinally from the attachment end towards the insertion end;
- an attachment finger having an attachment head that inserts longitudinally into the attachment aperture;
- an attachment body of the attachment finger, wherein the attachment body is sized to insert longitudinally into the drill pipe; and
- an outermost surface of the attachment body formed by at least two outer ridges;
- at least two grooves extending longitudinally across the attachment body without winding around an outer surface of the attachment body, wherein the grooves are located adjacent the outer ridges, wherein the grooves are located radially inward from the outer ridges.

17. The system of claim 16 further comprising:
- a removal aperture of the mandrel wherein the removal aperture extends through the mandrel.

18. The system of claim 17 wherein the outer ridges extend parallel to a longitudinal axis.

\* \* \* \* \*